United States Patent
Pertijs et al.

(10) Patent No.: US 7,446,598 B2
(45) Date of Patent: Nov. 4, 2008

(54) BIAS CIRCUITS

(75) Inventors: Michiel Pertijs, Delft (NL); Johan Huijsing, Schipluiden (NL)

(73) Assignee: NXP B.V., Eindhoven (NL)

( * ) Notice: Subject to any disclaimer, the term of this patent is extended or adjusted under 35 U.S.C. 154(b) by 44 days.

(21) Appl. No.: 11/575,301

(22) PCT Filed: Sep. 13, 2005

(86) PCT No.: PCT/IB2005/052991

§ 371 (c)(1),
(2), (4) Date: Mar. 14, 2007

(87) PCT Pub. No.: WO2006/030375

PCT Pub. Date: Mar. 23, 2006

(65) Prior Publication Data

US 2008/0094131 A1    Apr. 24, 2008

(30) Foreign Application Priority Data

Sep. 15, 2004  (EP) ................... 0420484
Apr. 19, 2005  (EP) ................... 0507821

(51) Int. Cl.
    G05F 1/10  (2006.01)
(52) U.S. Cl. ................. 327/539; 327/512
(58) Field of Classification Search ............. 327/512, 327/513, 534, 537, 539
    See application file for complete search history.

(56) References Cited

U.S. PATENT DOCUMENTS

| | | | |
|---|---|---|---|
| 6,242,897 B1 * | 6/2001 | Savage et al. | 323/313 |
| 6,933,770 B1 * | 8/2005 | Ranucci | 327/539 |
| 7,053,694 B2 * | 5/2006 | Ozawa | 327/539 |
| 7,071,767 B2 * | 7/2006 | Ou-yang et al. | 327/539 |
| 7,215,183 B2 * | 5/2007 | Nakada | 327/539 |

* cited by examiner

Primary Examiner—Jeffrey S Zweizig
(74) Attorney, Agent, or Firm—Peter Zawilski

(57) ABSTRACT

A bias circuit for use in bandgap voltage reference circuits and temperature sensors comprises a pair of transistors (Q, Q2), the first of which (Q1) is arranged to be biased at an emitter current $I_{bias}$, and the second of which (Q2) is arranged to be biased at an emitter current of $m.Ibi_{as}$. The circuit is arranged such that the difference between the base-emitter voltages of the transistors is generated in part across a first resistance means having a value $R_{bias}$ and in use carrying a bias current equal to $I_{bias}$ and in part across a second resistance means of value substantially equal to $R_{bias}/m$ and in use carrying a current equal to the base current of the second transistor. This results in use in a bias current $I_{bias}$ which, when used to bias a substrate bipolar transistor via its emitter, produces a collector current therefrom which is substantially PTAT and a base-emitter voltage which is substantially independent of the forward current gain of the substrate bipolar transistor.

7 Claims, 4 Drawing Sheets

BIAS CIRCUITS

The present invention relates to a bias circuit, and more particularly to a bias circuit for use in bandgap voltage reference circuits and temperature sensors, for example.

Bias circuits that generate a current proportional to absolute temperature (PTAT) are widely used in integrated circuits. Their main application is in temperature-independent biasing of bipolar transistors (and CMOS transistors in weak-inversion). PTAT bias circuits are also used in bandgap voltage references, where a PTAT voltage is combined with the base-emitter voltage of a bipolar transistor to yield a temperature-independent reference voltage. Another application is in temperature sensors, where a PTAT voltage or current is used as a measure of temperature.

PTAT bias circuits, bandgap references and temperature sensors in CMOS technology are usually based on substrate bipolar transistors (FIG. 1). The collector of such transistors is formed by the substrate and is thus grounded. Therefore, such transistors are usually biased via their emitter, as shown in relation to transistor Q in FIG. 2, resulting in a collector current:

$$I_C = \frac{B_F}{B_F+1} I_{bias},\quad (1)$$

where $B_F$ is the transistor's large-signal forward current-gain, and $I_{bias}$ is the current applied to the emitter.

Thus, an undesired dependency on $B_F$ is introduced in the base-emitter voltage:

$$V_{BE} = \frac{kT}{q}\ln\left(\frac{I_C}{I_S}\right) = \frac{kT}{q}\ln\left(\frac{I_{bias}}{I_S}\frac{B_F}{B_F+1}\right) = \frac{kT}{q}\ln\left(\frac{I_{bias}}{I_S}\right) + \frac{kT}{q}\ln\left(\frac{B_F}{B_F+1}\right),\quad (2)$$

where k is Boltzmann's constant, q is the electron charge, T is the absolute temperature and $I_S$ is the transistor's saturation current.

In older CMOS processes, $B_F$ was rather large, so that the error term in (2) is small. For a typical $B_F$ of 22 in 0.7 μm CMOS, the error is around 1 mV. With every new process generation, however, the typical value of $B_F$ decreases (Table 1). For 0.18 μm the error has increased to about 14 mV.

TABLE 1

Typical values of the forward current-gain $B_F$ of substrate pnp transistors, for various CMOS process generations.

| CMOS generation | Typical $B_F$ |
| --- | --- |
| 0.7 μm | 22 |
| 0.5 μm | 8 |
| 0.35 μm | 5.5 |
| 0.25 μm | 1.5 |
| 0.18 μm | 1.4 |

If $B_F$ was temperature and process independent, the error term in (2) could be compensated for by scaling $I_{bias}$ with a factor $(B_F+1)/B_F$. However, $B_F$ is strongly temperature dependent and varies from wafer to wafer. Thus, the dependency on $B_F$ affects the spread and temperature dependency of $V_{BE}$, and will do so more strongly with every new process generation, degrading the initial accuracy of bandgap references and temperature sensors.

A conventional CMOS PTAT bias circuit is shown in FIG. 3. Two matched substrate pnp transistors $Q_1$ and $Q_2$ are biased at a 1:m emitter-current ratio by transistors $T_1$ and $T_2$ where transistor $T_2$ is dimensioned so as to provide an m times larger drain current than transistor $T_1$, typically by constructing it from a parallel combination of m identical copies of $T_1$. Assuming that their current gain is current independent, their collector-current ratio will also be 1:m. As a result, the difference in base-emitter voltages will be:

$$\Delta V_{BE} = V_{BE2} - V_{BE1} = \frac{kT}{q}\ln(m),\quad (3)$$

which is PTAT. By means of op-amp 10, the emitter of transistor $Q_2$ and the upper terminal of a resistor $R_{bias}$ in series with the emitter of transistor $Q_1$ are kept at the same potential, so that the difference in base-emitter voltage $\Delta V_{BE}$ of transistors $Q_1$ and $Q_2$ is generated across the resistor $R_{bias}$. As a result, the bias currents in the circuit are:

$$I_{bias} = \frac{\Delta V_{BE}}{R_{bias}} = \frac{kT\ln(m)}{qR_{bias}}\quad (4)$$

If this bias current is applied to the emitter of transistor $Q_3$ by transistor $T_3$, which is matched to transistor $T_1$, and thus carries the same drain current, its collector current will not be PTAT due to its finite current gain $B_F$, and as a result its base-emitter voltage $V_{BE3}$ can be described by (2) and will be affected by spread and temperature-dependency of $B_F$.

The present invention provides a bias circuit comprising a pair of transistors, the first of which is arranged to be biased at an emitter current $I_{bias}$, and the second of which is arranged to be biased at an emitter current of $m.I_{bias}$, the circuit being arranged such that the difference between the base-emitter voltages of the transistors is generated in part across a first resistance means having a value $R_{bias}$ and in use carrying a bias current equal to $I_{bias}$ and in part across a second resistance means of value substantially equal to $R_{bias}/m$ and in use carrying a current equal to the base current of the second transistor.

This results in use in a bias current $I_{bias}$ which, when used to bias a substrate bipolar transistor via its emitter, produces a collector current therefrom which is substantially PTAT and a base-emitter voltage which is substantially independent of the forward current gain of the substrate bipolar transistor. Thus, the bias circuit of the invention may be used in a high accuracy bandgap voltage reference circuit, or a high accuracy temperature sensor.

Preferably, the pair of transistors arranged to be biased at a 1:m emitter current ratio are substrate bipolar transistors. They may be matched bipolar transistors and may have unequal emitter areas.

In one embodiment, the value of the second resistance means is reduced by $R_{base}$ (m−1)/m to counter effects due to the non-ideal non-zero base resistance $R_{base}$ of the transistor pair.

According to another aspect, the invention provides a voltage reference circuit comprising a bias circuit embodying the invention as defined above, and a substrate bipolar transistor, wherein the bias current $I_{bias}$ is used to bias the bipolar transistor via its emitter to produce a base-emitter voltage which is used to generate a substantially temperature-independent bandgap reference voltage.

Furthermore, the invention provides a temperature sensor including a bias circuit or voltage reference circuit embodying the invention as defined above.

A device and circuits of the prior art, and embodiments of the invention are described herein with reference to the accompanying drawings, wherein.

Figure 4:
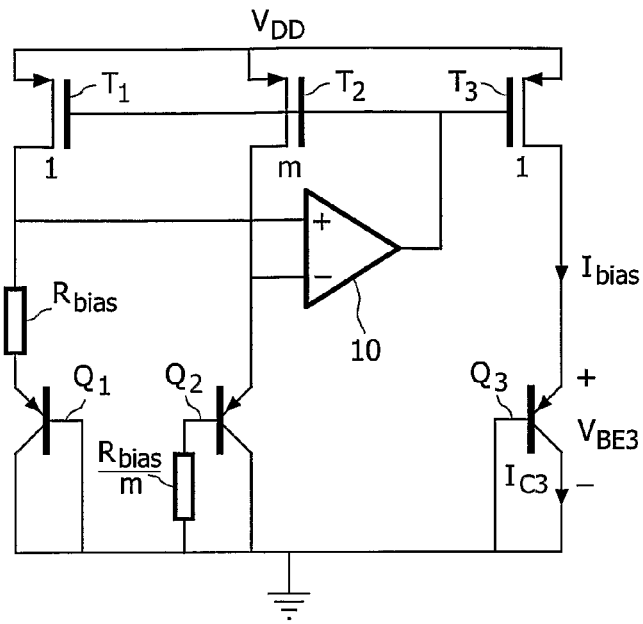
FIG. 4 is a circuit diagram of a PTAT bias circuit according to an embodiment of the invention.

A circuit diagram of a bias circuit embodying the invention is shown in FIG. 4. With an extra resistor $R_{bias}/m$ in series with the base of $Q_2$, an expression for the bias current $I_{bias}$ is given by the following equation:

$$V_{BE1} + I_{bias} R_{bias} = m I_{bias} \frac{1}{1 + B_F} \frac{R_{bias}}{m} + V_{BE2} \quad (5)$$

$$\Rightarrow I_{bias} = \frac{1 + B_F}{B_F} \frac{\Delta V_{BE}}{R_{bias}}$$

Figure 1:
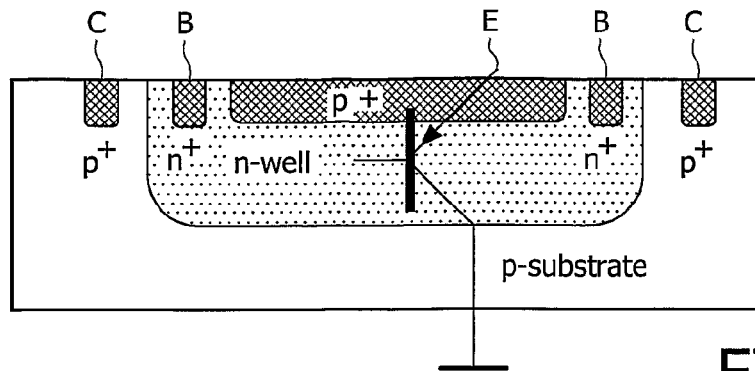
FIG. 1 is a cross-sectional side view of a known substrate pnp transistor in CMOS technology.
Figure 2:
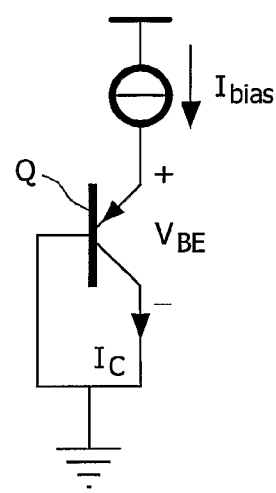
FIG. 2 is a circuit diagram illustrating biasing of a substrate pnp transistor via its emitter in a known manner.
Figure 3:
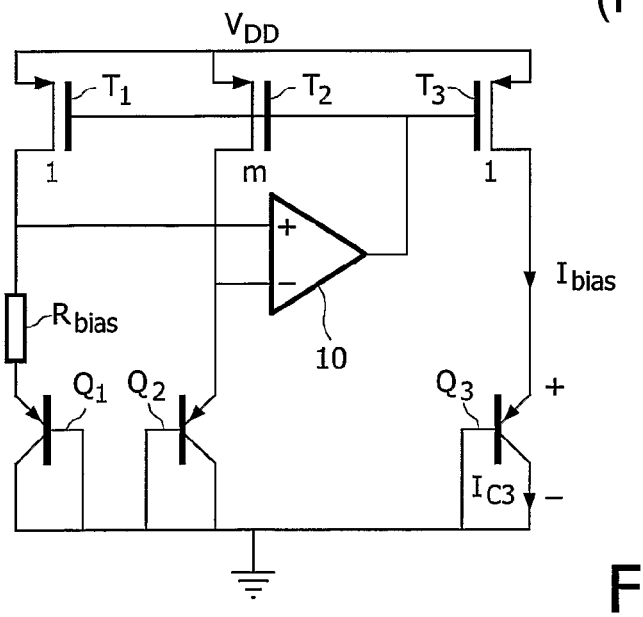
FIG. 3 is a circuit diagram of known PTAT bias circuit.

If this bias current is applied to the emitter of $Q_3$, its collector current will be:

$$I_{C3} = \frac{B_F}{1 + B_F} I_{bias} = \frac{\Delta V_{BE}}{R_{bias}}, \quad (6)$$

which is PTAT. Thus, the current gain ($B_F$) does not affect the collector current. The substrate bipolar transistor is therefore biased at a PTAT collector current, rather than a PTAT emitter current (as is the case in the circuit of FIG. 3). The error term due to $B_F$ in equation (2) disappears, making the transistor's base-emitter voltage independent of its current gain, and thereby reducing the spread in its absolute value and its temperature dependency.

Figure 5:
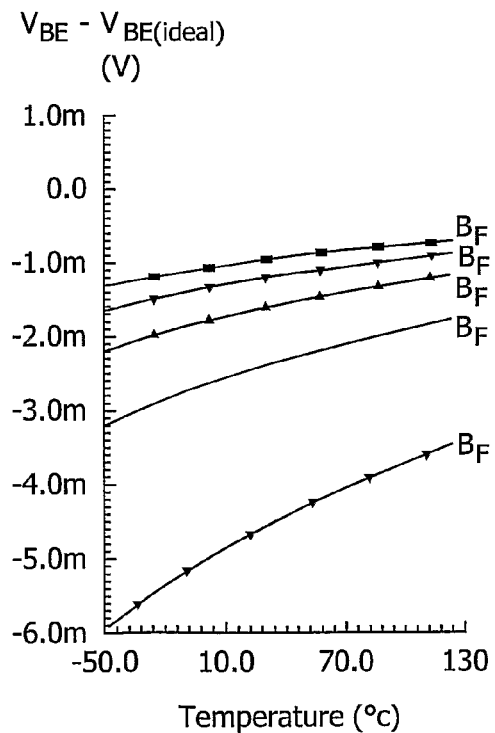
FIGS. 5 and 6 are graphs showing plots of base-emitter voltage against temperature for a transistor biased using the known circuit of FIG. 3, and the circuit according to an embodiment of the invention shown in FIG. 4, respectively.
Figure 6:
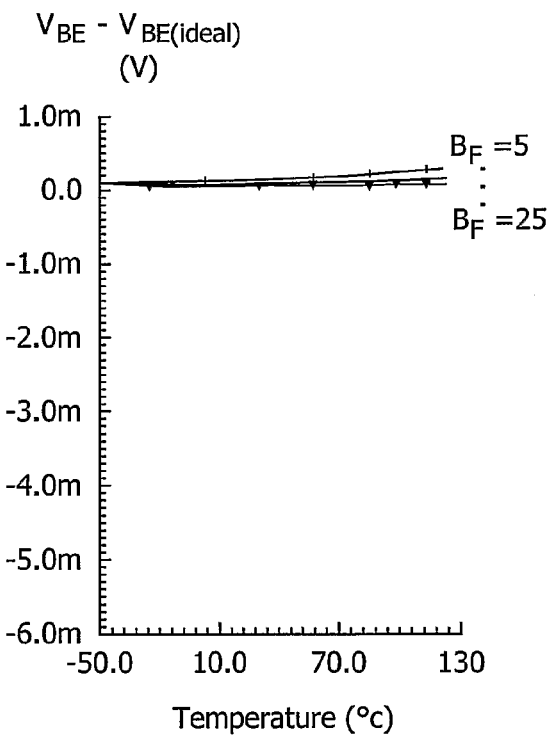

FIGS. 5 and 6 illustrate the improvement in the dependency of $V_{BE3}$ on $B_F$. In these simulations, $R_{bias}$ has a value of 200 kOhms, m=8 and $R_{base}$ is around 500 Ohms.

In practice, in the improved circuit, there may be still some (small) residual dependency, which results from the non-zero base resistance $R_{base}$ of the pnp transistors. The resistor in series with the base of $Q_2$ can be reduced by $R_{base}\cdot(m-1)/m$ to correct for the nominal value of $R_{base}$, but due to the different temperature dependency of $R_{bias}$ and $R_{base}$, some dependency will remain. As long as $R_{bias} \gg R_{base}$, this dependency can be kept small, and an improvement of more than 10× is obtained.

As for known PTAT bias circuits, many variations on the improved circuit of FIG. 4 are possible. For instance, it is possible to use different emitter areas for $Q_1$ and $Q_2$. All variations have in common that an extra resistor of value $R_{bias}/m$ is added in series with the base of the transistor with the highest emitter current density, where m is the ratio of the emitter currents of $Q_1$ and $Q_2$.

Figure 7:
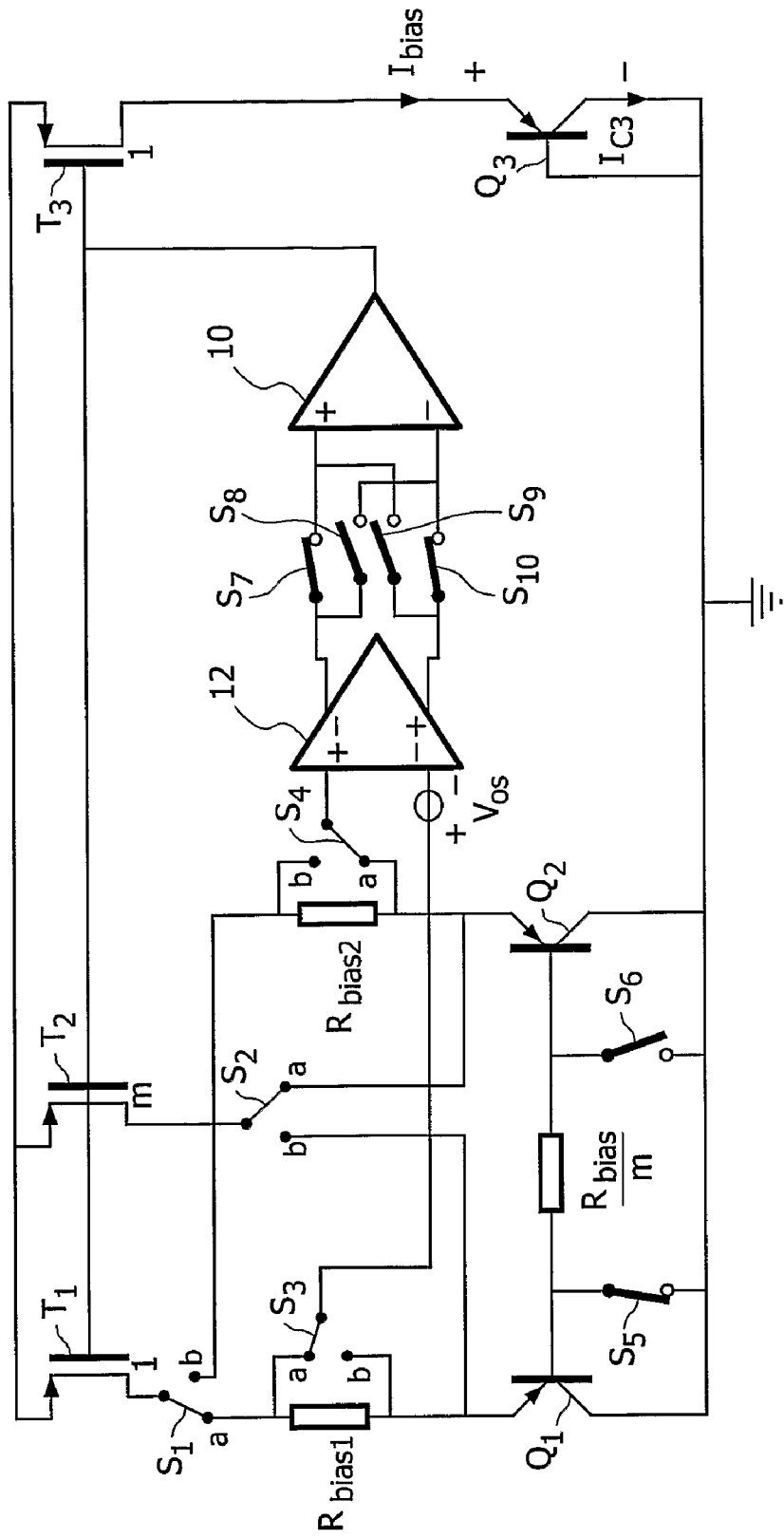
FIG. 7 is a circuit diagram of a PTAT bias circuit according to a second embodiment of the invention.

The accuracy of the circuit of FIG. 4 is limited by the offsets of the opamp 10 and the bipolar transistors. FIG. 7 shows a development of that circuit in which the contribution of these offsets is strongly reduced by means of chopping.

The circuit of FIG. 7 is formed by adding to the embodiment of FIG. 4 two way switches $S_1$, $S_2$, $S_3$ and $S_4$, one way switches $S_5$ to $S_{10}$, while the op-amp now consists of two stages, a fully-differential first stage 12 and a second stage 10. Voltage source $V_{os}$ models the input-referred offset of these stages plus the offset of the bipolar transistors $Q_1$ and $Q_2$.

Switch $S_1$ is arranged to connect the source of transistor $T_1$ either (a) to the limb of the circuit including $Q_1$ (b) or the limb of $Q_2$, and $S_2$ operates in a complementary, opposite manner with respect to the source of transistor $T_2$.

Switch $S_3$ connects the opamp (via the offset source $V_{os}$) either to (a) the top terminal of resistor $R_{bias1}$, or (b) the bottom terminal of resistor $R_{bias1}$, which is also connected to the emitter of transistor $Q_1$.

Switch $S_4$ connects the opamp (via the positive input of its first stage 12) either to (a) the bottom terminal of resistor $R_{bias2}$, which is also connected to the emitter of transistor $Q_2$, or (b) the top terminal of resistor $R_{bias2}$.

Switches $S_5$ and $S_6$ cooperate such that either (a) the base of $Q_1$ is grounded and the resistor of value $R_{bias}/m$ is connected between the base of $Q_2$ and ground, or (b) vice versa.

Switches $S_7$ to $S_{10}$ cooperate to either (a) connect the negative output of the first stage 12 to the positive input of the second stage 10, and the positive output of the first stage 12 to the negative input of the second stage 10, or (b) vice-versa.

With the switches in the drawn position, that is, alternatives (a) above, the base-emitter voltage of $Q_3$ is $$V_{BE3,1} = \frac{kT}{q} \ln\left(\frac{\Delta V_{BE} + V_{os}}{R_{bias1} I_S}\right) \cong \frac{kT}{q} \ln\left(\frac{\Delta V_{BE}}{R_{bias1} I_S}\right) + \frac{kT}{q} \frac{V_{os}}{\Delta V_{BE}}, \quad (7)$$

where $V_{os}$ models the combined offset of the op-amp and that of the bipolars. With the switches in the other position, that is, alternatives (b) above, the sign of the offset term changes:

$$V_{BE3,2} = \frac{kT}{q} \ln\left(\frac{\Delta V_{BE} - V_{os}}{R_{bias2} I_S}\right) \cong \frac{kT}{q} \ln\left(\frac{\Delta V_{BE}}{R_{bias1} I_S}\right) - \frac{kT}{q} \frac{V_{os}}{\Delta V_{BE}}, \quad (8)$$

The average between the two values is $$V_{BE3,avg} = \quad (9)$$

$$\frac{kT}{2q} \ln\left(\frac{\Delta V_{BE}^2 - V_{os}^2}{R_{bias1} R_{bias2} I_S^2}\right) \cong \frac{kT}{q} \ln\left(\frac{\Delta V_{BE}}{I_S \sqrt{R_{bias1} R_{bias2}}}\right) - \frac{kT}{q} \frac{V_{os}^2}{2\Delta V_{BE}^2},$$

which shows that the offset is reduced by a factor $2\Delta V_{BE}/V_{os}$. If, for example, $V_{os}$=5 mV and $\Delta V_{BE}$=kT/q ln(m)=60 mV, the offset on $V_{BE3}$ is reduced from 2 mV to 0.09 mV.

The present invention may be applied to any bias circuit that generates a current proportional to absolute temperature (PTAT). Products that may utilise this invention include any circuits with bandgap references. This invention may also become particularly beneficial for designs in deep submicron CMOS technologies, where the $B_F$ values of the substrate bipolar transistors continue to reduce.

Figure 8:
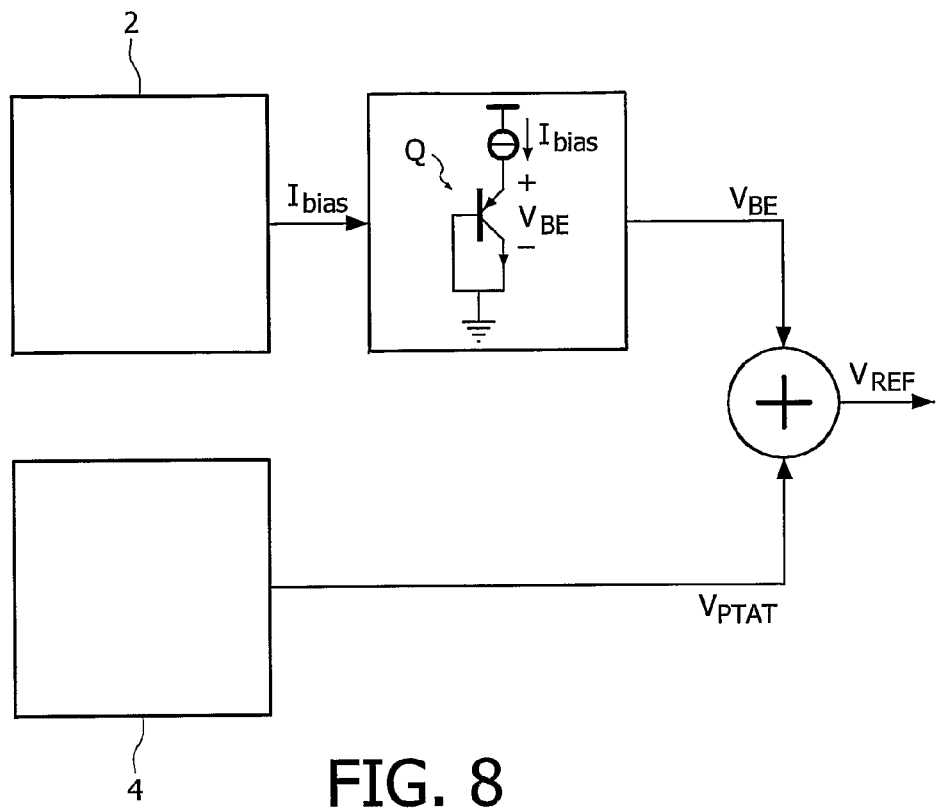
FIG. 8 is a block diagram of a bandgap voltage reference circuit according to an embodiment of the invention.

FIG. 8 shows how a bias circuit embodying the present invention may be incorporated in reference circuit. The current-gain independent bias circuit 2 configured in accordance with an embodiment of the invention generates a bias current $I_{bias}$. This current is supplied to the emitter of a bipolar transistor Q. A temperature-independent output voltage $V_{REF}$ is generated by summation of the base-emitter voltage $V_{BE}$ of the bipolar transistor Q and a PTAT voltage from PTAT voltage generator circuit 4. The latter compensates for the negative temperature coefficient of the former.

The bias circuit 2 may be used to generate the bias current $I_{bias}$ needed for the bipolar transistor, especially if this transistor is a diode-connected substrate pnp transistor, such that the generated base-emitter voltage, and hence the generated output voltage, is insensitive to spread of the transistor's current gain and thus will have a higher initial accuracy.

Figure 9:
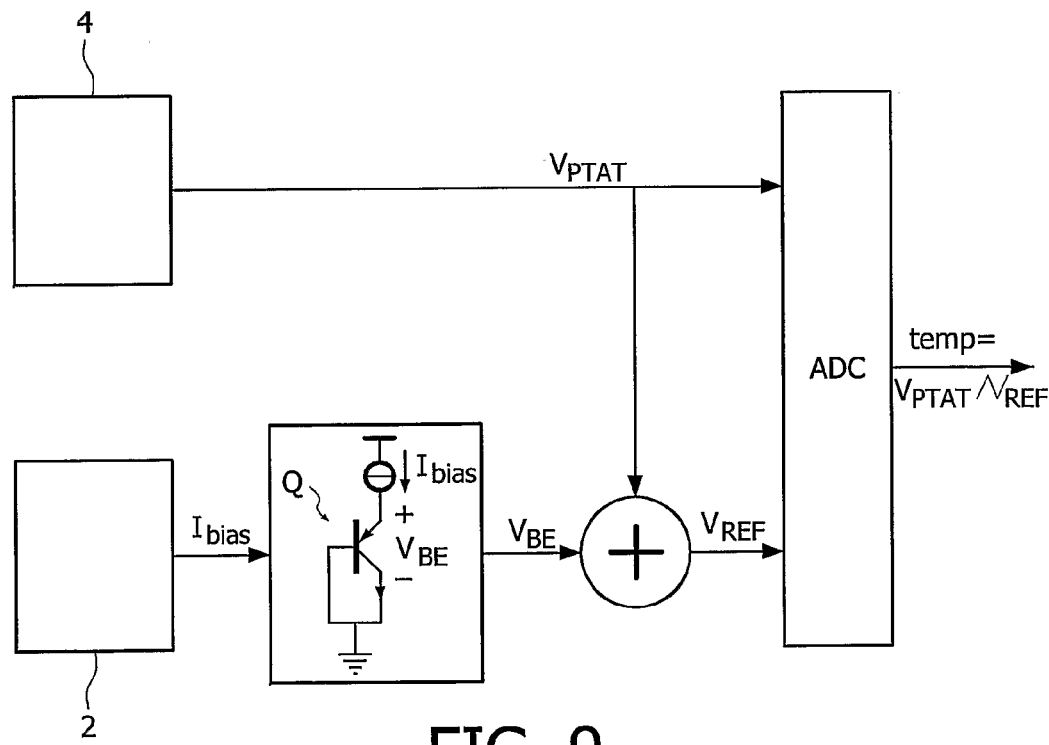
FIG. 9 is a block diagram of a temperature sensor according to a further embodiment of the invention.

FIG. 9 shows a smart temperature sensor circuit embodying the invention. An analog-to-digital converter (ADC) is used to generate a digital representation of temperature "temp". This converter essentially computes the ration of a temperature dependent voltage, such as a PTAT voltage $V_{PTAT}$, to a temperature-independent reference voltage $V_{REF}$. The latter can be generated in the same way as described above, and the bias circuit 2 may then be applied in a similar manner, so as to reduce the sensitivity of the reference voltage to spread of the current gain of the bipolar transistor Q used. The resulting improved initial accuracy of the reference voltage leads to an improved initial accuracy of the temperature sensor.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this application to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present application or of any further application derived therefrom.

The invention claimed is:

1. A bias circuit comprising a pair of transistors ($Q_1$, $Q_2$) the first of which ($Q_1$) is arranged to be biased at an emitter current $I_{bias}$, and the second of which ($Q_2$) is arranged to be biased at an emitter current of m.$I_{bias}$, the circuit being arranged such that the difference between the base-emitter voltages of the transistors is generated in part across a first resistance means having a value $R_{bias}$ and in use carrying a bias current equal to $I_{bias}$ and in part across a second resistance means of value substantially equal to $R_{bias}/m$ and in use carrying a current equal to the base current of the second transistor.

2. A bias circuit of claim 1 wherein the pair of transistors ($Q_1$, $Q_2$) arranged to be biased at a 1:m emitter current ratio are substrate bipolar transistors.

3. A bias circuit of claim 1 wherein the pair of transistors ($Q_1$, $Q_2$) arranged to be biased at a 1:m emitter current ratio are matched bipolar transistors.

4. A bias circuit of claim 1 wherein the pair of transistors ($Q_1$, $Q_2$) arranged to be biased at a 1:m emitter current ratio have unequal emitter areas.

5. A bias circuit of claim 1 wherein the value of the second resistance means is reduced by an amount substantially equal to $R_{base}$ (m−1)/m to counter effects due to the non-ideal non-zero base resistance $R_{base}$ of the transistor pair.

6. A voltage reference circuit comprising a bias circuit (2) of claim 1, and a substrate bipolar transistor (Q), wherein the bias current $I_{bias}$ is used to bias the bipolar transistor via its emitter to produce a base-emitter voltage which is used to generate a substantially temperature-independent bandgap reference voltage ($V_{REF}$).

7. A temperature sensor including the circuit of claim 1.

* * * * *